(12) United States Patent
Schaefer

(10) Patent No.: US 7,278,192 B2
(45) Date of Patent: Oct. 9, 2007

(54) LATHE FOR MACHINING OPTICAL WORKPIECES

(75) Inventor: Holger Schaefer, Weilmuenster (DE)

(73) Assignee: Satisloh GmbH, Wetzlar (DE)

( * ) Notice: Subject to any disclaimer, the term of this patent is extended or adjusted under 35 U.S.C. 154(b) by 0 days.

(21) Appl. No.: 11/415,046

(22) Filed: May 1, 2006

(65) Prior Publication Data

US 2006/0248697 A1 Nov. 9, 2006

(30) Foreign Application Priority Data

May 6, 2005 (DE) .................. 10 2005 021 638

(51) Int. Cl.
*B23B 27/00* (2006.01)

(52) U.S. Cl. .................. 29/27 C; 29/560; 409/134; 82/121

(58) Field of Classification Search .............. 29/27 C, 29/33 R, 26 A, 560, 563, 564; 409/134, 409/202; 82/121, 129, 142

See application file for complete search history.

(56) References Cited

U.S. PATENT DOCUMENTS

| | | | |
|---|---|---|---|
| 3,881,378 A | | 5/1975 | Bettiol |
| 4,826,127 A | | 5/1989 | Koblischek et al. |
| 4,955,770 A | * | 9/1990 | Kitamura ............ 409/134 |
| 5,213,019 A | * | 5/1993 | Carlyle et al. ........ 82/142 |
| 5,230,685 A | * | 7/1993 | Christen et al. ........ 483/55 |
| 5,415,610 A | * | 5/1995 | Schutz et al. .......... 483/16 |
| 5,439,431 A | | 8/1995 | Hessbruggen et al. |
| 5,611,137 A | * | 3/1997 | Braun ................ 29/560 |
| 5,678,291 A | * | 10/1997 | Braun ................ 29/26 A |
| 5,910,201 A | * | 6/1999 | Muscarella et al. ..... 82/129 |
| 6,161,457 A | * | 12/2000 | Hammer ............. 82/121 |
| 6,394,892 B2 | | 5/2002 | Hanisch et al. |
| 6,523,443 B1 | | 2/2003 | Hof et al. |
| 6,632,054 B2 | * | 10/2003 | Geiger et al. ......... 409/202 |
| 6,813,822 B2 | * | 11/2004 | Baldini et al. ......... 29/563 |
| 2001/0042424 A1 | * | 11/2001 | Sheehan et al. ........ 82/121 |
| 2003/0183050 A1 | | 10/2003 | Savoie et al. |
| 2004/0103741 A1 | | 6/2004 | Burkert et al. |

* cited by examiner

*Primary Examiner*—Dana Ross
(74) *Attorney, Agent, or Firm*—Reising, Ethington, Barnes, Kisselle, P.C.

(57) ABSTRACT

A lathe for machining optical workpieces, in particular spectacle lenses, comprises a fast tool arrangement and a workpiece spindle arrangement. A machine frame is cast monolithically from polymer concrete and on and in which all the functional surfaces, functional spaces and other cutouts are formed to their exact dimensions during the casting process. The machine frame upper part cast in one piece simultaneously covers the fast tool arrangement and the workpiece spindle arrangement and thus the machine bed in the manner of a covering hood. The machine frame is of compact dimensions, has a very rigid oscillation-damping machine bed and, in comparison with the rapidly moving elements of the fast tool arrangement, has a very large mass with a high center of gravity, which prevents the transmission of disruptive oscillations from the fast tool movement to the machine bed and thus to the workpiece spindle arrangement. The lathe can be manufactured in a cost-effective manner and allows the production of any spectacle lens optical surfaces with extremely high dimensional accuracy and surface quality. The achievable optical surface quality allows direct polishing by means of flexible or adaptable polishing tools, as a result of which considerable savings are made in the subsequent process. If suitably equipped with a cutter spindle arrangement, edge machining operations on the spectacle lenses can be carried out.

5 Claims, 3 Drawing Sheets

LATHE FOR MACHINING OPTICAL WORKPIECES

BACKGROUND OF THE INVENTION

The invention relates to a lathe for machining optical workpieces, in particular spectacle lenses.

In the highly precise turning-machining of non-rotationally symmetrical spectacle lenses, use is made of so-called fast tools which are designed as turning tool mounts which can be moved in a highly dynamic manner and comprise a dedicated drive for guiding the turning tools in a linear-reciprocal or rotational movement. During the machining of such spectacle lenses, stroke movements of the turning tool of up to approx. 30 mm stroke length and extremely high accelerations of up to approx. 20 g take place. On account of these high accelerations in alternating directions of movement, oscillations are generated which are transmitted as vibrations to the machine frame. These vibrations are highly undesirable since they give rise to form errors on the machined optical workpiece surfaces.

DESCRIPTION OF THE PRIOR ART

It has already been proposed to compensate the moving fast tool mass by mass compensation effected by means of a corresponding compensation mass oscillating in an opposing manner, so that no disruptive oscillations can be transmitted to the machine bed. By way of example, use is made of a number of fast tool arrangements (US 2003/0183050 A1) which oscillate in the opposite direction to the tool actively involved in the turning operation. In another known machining machine (EP 0 854 769 B1), it is provided that the reaction force brought about by the acceleration of the linear drive is dynamically compensated by a second linear drive which is arranged collinear to the first linear drive and the housing or stator of which is mechanically coupled to the housing or stator of the first linear drive via the machine bed and which is actuated in the opposite direction to the first linear drive. The disadvantage of the known type of mass compensation lies in the high mechanical, electrical and control engineering outlay required to generate synchronous mass compensation movements.

SUMMARY OF THE INVENTION

The object of the invention is to provide a lathe, in which the transmission of disruptive vibrations generated by the fast tool to the machine bed is prevented in a manner that is both simple and cost-effective.

According to the present invention, there is provided a lathe for machining optical workpieces, in particular spectacle lenses, comprising a fast tool arrangement and a workpiece spindle arrangement, which is mounted on a rigid machine bed and is covered by a machine upper part, wherein the machine bed and the machine upper part are made from polymer concrete as a single-piece machine frame, thereby forming all the functional surfaces and spaces.

So according to the basic concept of the invention, a heavy and rigid machine frame which has good damping properties and is made of polymer concrete is provided, said machine frame having a machine upper part made of polymer concrete which is molded on in one piece and in which machine elements, in particular the fast tool arrangement and the workpiece spindle arrangement, which are to be fitted on the machine bed, can be easily mounted and calibrated.

While, according to the prior art, the upper part of such a lathe consists only of a hood which can be easily placed on said machine and is made of sheet metal or fiber-reinforced materials, according to the invention the machine upper part is made of polymer concrete with thick and heavy wall parts, which together with the machine bed form a single-piece machine frame made of polymer concrete. Continuing the inventive concept, therefore, the desire is for as high a ratio as possible between the mass of the moving parts of the fast tool arrangement and the mass of the machine frame. By way of example, the moving parts of the fast tool arrangement may have a mass of 1.2 kg, while the stationary part of the machine, that is to say the machine frame made of polymer concrete and the remaining components of the machine, may have a mass of 1200 kg. The mass ratio in this case is 1:1000. It has been found that, by virtue of the monolithic design of the polymer concrete machine frame according to the invention, it is not possible for any disruptive vibrations generated by the fast tool arrangement to be transmitted to the machine frame and thus to the workpiece spindle, so that no form errors can occur on the machined optical workpiece surface.

The one-piece manufacture of the polymer concrete machine frame opens up the advantageous possibility of forming all the functional surfaces, functional spaces and other cutouts to their exact dimensions at the time of manufacture. For example, the functional surfaces may include the mounting surfaces for the fast tool arrangement, the workpiece spindle arrangement with transverse slide arrangement and possibly an additional cutter spindle arrangement, and also the support surfaces for a control panel and depositing surfaces, while the functional spaces may for example include a working space, a cabinet space for pneumatic elements of the machine and a cabinet space for electrical/electronic elements of the machine.

Preferably, the lathe is designed in such a way that the center of gravity of the lathe lies approximately in the movement plane of the fast tool arrangement, as a result of which it is not possible for there to be any tilting moments about the center of gravity caused by the fast tool arrangement, which ensures a trouble-free machining operation.

In order to create a smooth surface for mounting the fast tool arrangement, the workpiece spindle arrangement with transverse slide arrangement and possibly the additional cutter spindle arrangement, the associated mounting surfaces can be grouted with an epoxy resin.

BRIEF DESCRIPTION OF THE DRAWINGS

Further details regarding the invention will be explained below with reference to the drawings which show an example of embodiment. In the drawings.

DESCRIPTION OF THE PREFERRED EMBODIMENT

Figure 1:
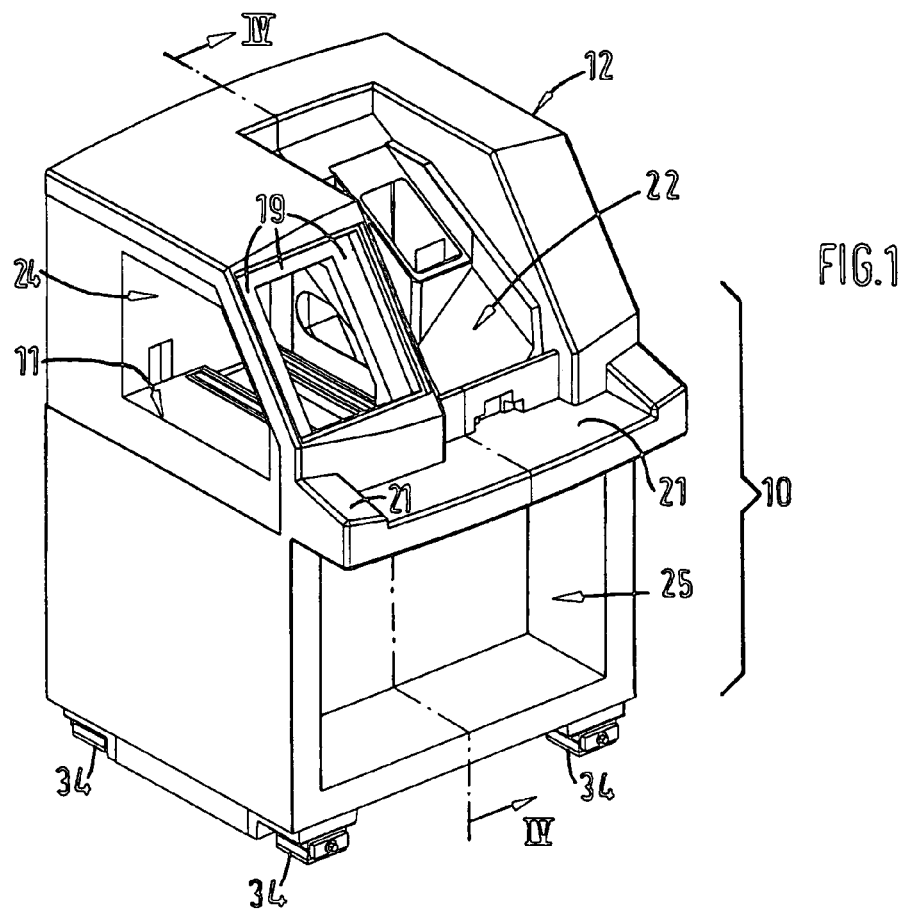
FIG. 1 shows a perspective front view of the one-piece machine frame made of polymer concrete, essentially prior to the mounting of the functional elements of the lathe.
Figure 2:
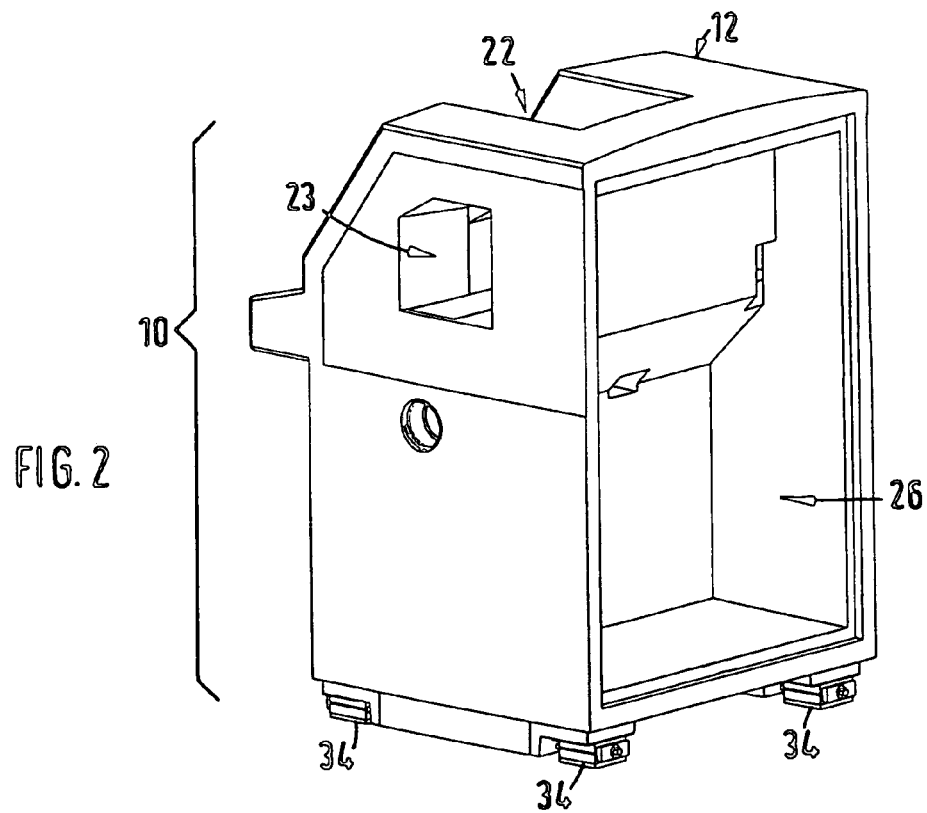
FIG. 2 shows a perspective rear view of the machine frame shown in FIG. 1.

The one-piece machine frame 10 which is shown in the drawings is cast from a polymer concrete suitable for machine construction. Polymer concrete is a composite material consisting of a mineral filler blend and a binder based on reaction resin, and is also referred to as cast mineral composite on account of its composition. The reaction resin used is usually an epoxy resin, since epoxy resins are best able to satisfy the main requirements of the cast mineral composite, namely a high modulus of elasticity, good damping behavior, low internal stresses, minimal shrinkage for high dimensional accuracy and a low thermal expansion coefficient.

Figure 3:
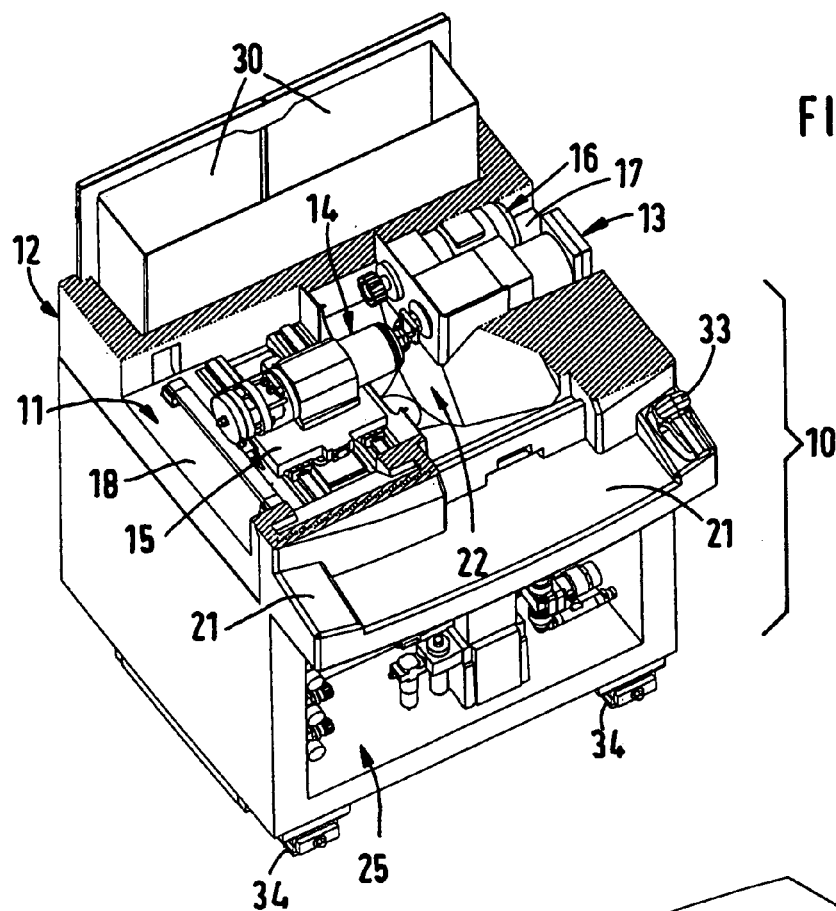
FIG. 3 shows a perspective view in horizontal section, in which the machine upper part of the assembled machine is cut approximately at the level of the fast tool arrangement and the workpiece spindle arrangement.

The machine frame 10 comprises a machine bed 11 and a machine upper part 12 which is cast in one piece therewith. As can best be seen from FIG. 3, the fast tool arrangement 13 and the workpiece spindle arrangement 14 are arranged on the machine bed 11 and fixed thereto by screwing, in the case of the workpiece spindle arrangement 14 via a transverse slide arrangement 15. In the example shown, a cutter spindle arrangement 16 which serves for edge machining of the spectacle lenses is located next to the fast tool arrangement 13.

The machine bed 11 is very rigid and resistant to oscillations on account of its thick-walled design and the specific properties of the polymer concrete. Taking account of the mass of the functional parts which are securely connected to the machine frame 10, mainly the masses of the fast tool arrangement 13, the workpiece spindle arrangement 14 and the cutter spindle arrangement 16, the desired shift in the center of gravity of the lathe approximately into the movement plane of the fast tool arrangement 13 can be achieved in a simple manner in design terms by suitably configuring the machine bed 11 and the machine upper part 12, that is to say by suitable distribution of the masses between machine bed 11 and machine upper part 12.

All the functional surfaces and spaces and all the other cutouts in the machine frame 10 can be produced at the time of casting the polymer concrete by suitably configuring the casting mold. The functional surfaces include the mounting surfaces 17 and 18 on the machine bed 11 for the fast tool arrangement 13 and the cutter spindle arrangement 16 and for the workpiece spindle arrangement 14 with the associated transverse slide arrangement 15, the support surfaces 19 for a control panel 20 (FIG. 5) and depositing surfaces 21.

The functional spaces include the actual working space 22 of the lathe, in which machining of the spectacle lens blank driven by the CNC-controlled workpiece spindle arrangement 14 is carried out by the fast tool and possibly at the same time by the edge machining cutter of the cutter spindle arrangement 16. The functional spaces of the machine frame 10 also include cutouts 23 and 24 in the machine upper part 12, which cutouts are connected to the working space 22 and serve to accommodate the fast tool arrangement 13 with the cutter spindle arrangement 16 and the workpiece spindle arrangement 14. Finally, the functional spaces also include a cabinet space 25 for pneumatic elements, which is located in the machine bed 11, and a cabinet space 26 for electrical/electronic elements, which extends from the machine bed 11 into the machine upper part 12.

Figure 4:
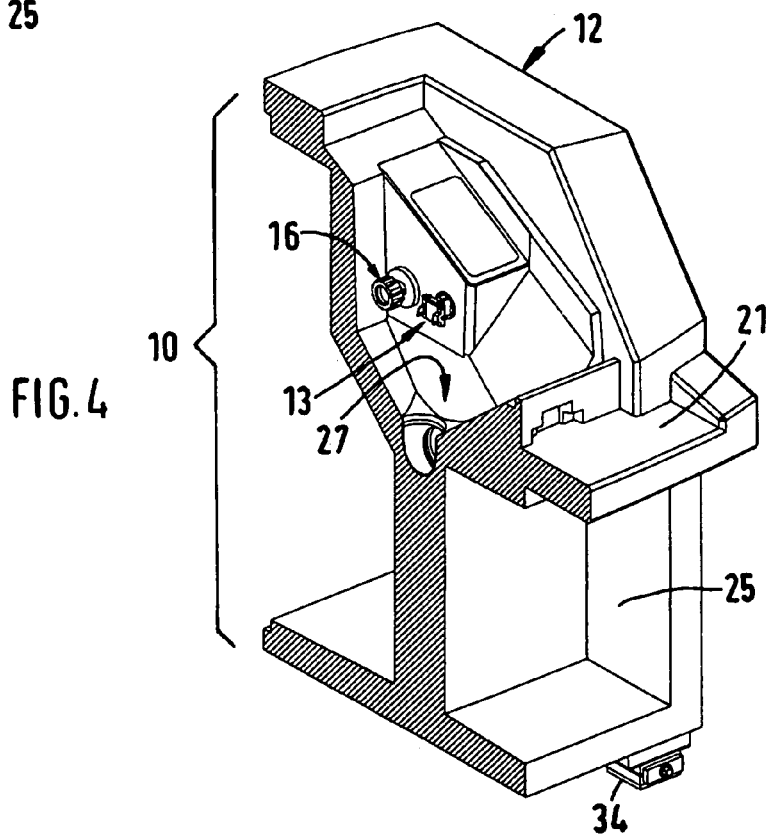
FIG. 4 shows a perspective view in vertical section along the section line IV-IV in FIG. 1.

Adjoining the working space 22 on the lower side thereof as a further functional space is a collecting space 27 for the coolant supplied to the machining site, as can best be seen in FIG. 4. The coolant passing into the collecting space 27 is discharged towards the outside through an opening 28 (FIG. 6).

Figure 5:
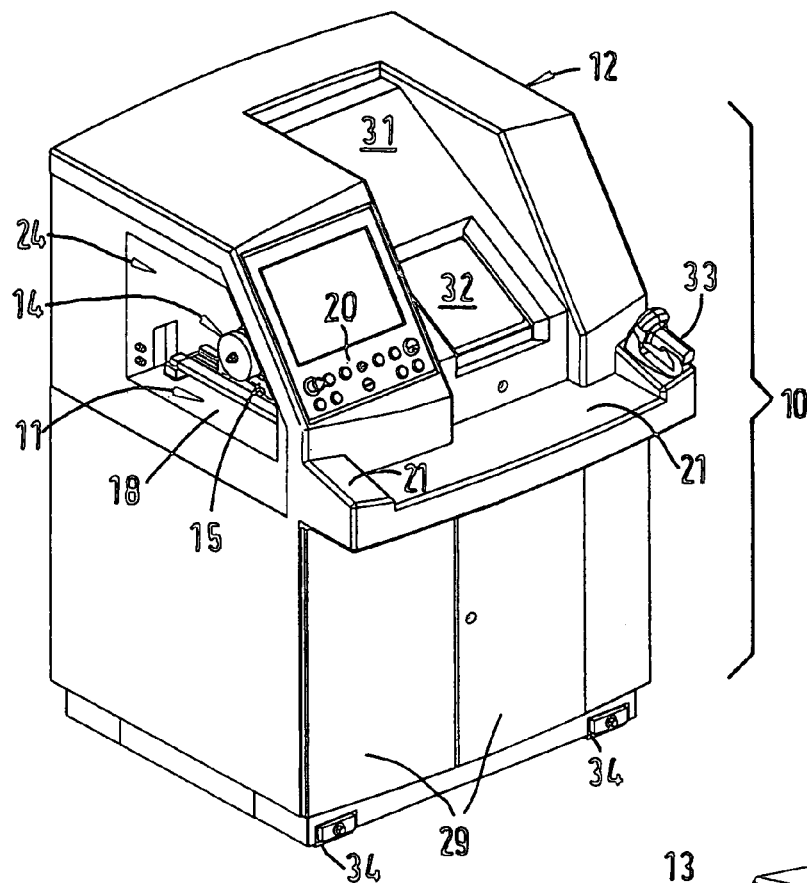
FIG. 5 shows a perspective front view similar to FIG. 1, but with the machine fully assembled.
Figure 6:
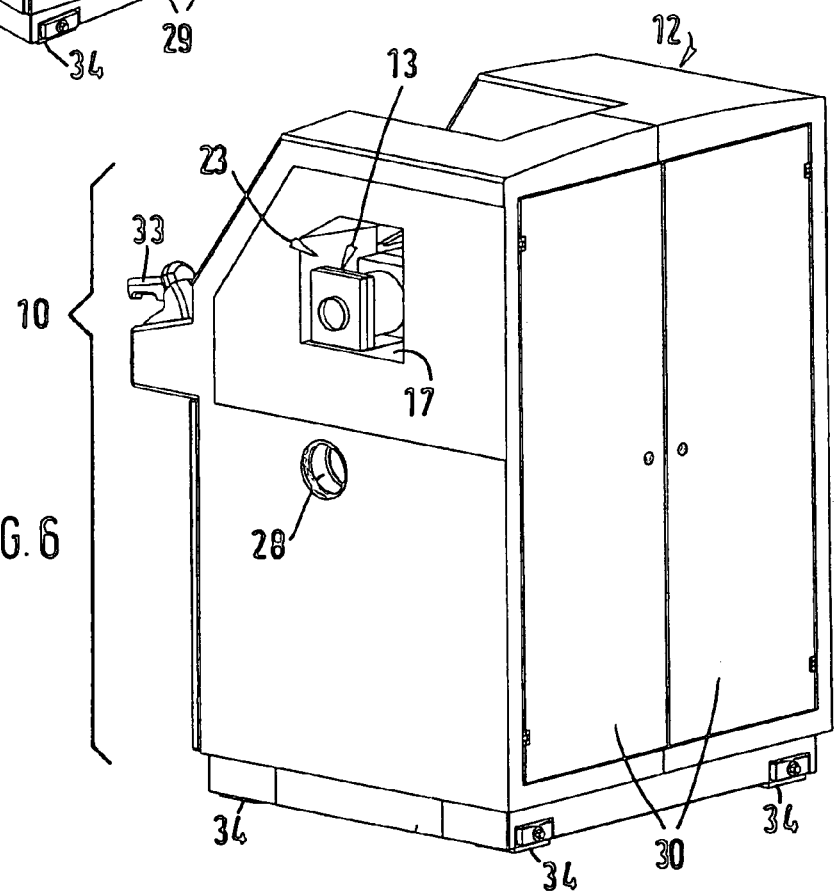
FIG. 6 shows a perspective rear view of the machine shown in FIG. 5.

As can be seen from FIGS. 5 and 6, when the lathe is fully assembled, the cabinet spaces 25 and 26 can be closed by doors 29 and 30. The working space 22 can be covered at the top and front by a spray protection cover 31, in which there is a flap which opens automatically for tool change purposes, said flap having a viewing window 32, as can be seen from FIG. 5.

FIGS. 5 and 6 also show a barcode reader 33 on the machine frame 10, which serves to detect the data of the spectacle lens blank. As can be seen from all the drawings, height-adjustable feet 34 are provided at the four bottom corners of the machine frame 10.

In summary, a lathe is provided for machining optical workpieces, in particular spectacle lenses, comprising a fast tool arrangement and a workpiece spindle arrangement, wherein the lathe has a machine frame which is cast monolithically from polymer concrete and on and in which all the functional surfaces, functional spaces and other cutouts are formed to their exact dimensions during the casting process. The machine upper part of the machine frame cast in one piece simultaneously covers the fast tool arrangement and the workpiece spindle arrangement and thus the machine bed in the manner of a covering hood. The monolithic machine frame made of polymer concrete is of compact dimensions, has a very rigid oscillation-damping machine bed and, in comparison with the rapidly moving elements of the fast tool arrangement, has a very large mass with a high center of gravity, which prevents the transmission of disruptive oscillations from the fast tool movement to the machine bed and thus to the workpiece spindle arrangement. The lathe designed in this way can be manufactured in a cost-effective manner and allows the production of any spectacle lens optical surfaces with extremely high dimensional accuracy and surface quality. The achievable optical surface quality allows direct polishing by means of flexible or adaptable polishing tools, as a result of which considerable savings are made in the subsequent process. If suitably equipped with a cutter spindle arrangement, edge machining operations on the spectacle lenses can be carried out.

Other variations and modifications are possible without departing from the scope and spirit of the present invention as defined by the appended claims.

I claim:

1. Lathe for machining optical workpieces, in particular spectacle lenses, comprising a fast tool arrangement and a workpiece spindle arrangement, which is mounted on a rigid machine bed and is covered by a machine upper part, the machine bed and the machine upper part being made from polymer concrete as a single-piece machine frame, thereby forming all the functional surfaces and spaces, wherein the functional surfaces include mounting surfaces for the fast tool arrangement, the workpiece spindle arrangement which has a transverse slide arrangement, and also support surfaces for a control panel and depositing surfaces, and wherein the functional spaces include a working space, a cabinet space for pneumatic elements of the machine and a cabinet space for electrical/electronic elements of the machine.

2. Lathe according to claim 1, wherein the functional surfaces further include a mounting surface for a cutter spindle arrangement.

3. Lathe according to claim 2, wherein the mounting surface for the additional cutter spindle arrangement is grouted with an epoxy resin to form a smooth surface.

4. Lathe according to claim 1, wherein the mounting surfaces for the fast tool arrangement and the workpiece spindle arrangement with transverse slide arrangement are grouted with an epoxy resin to form a smooth surface.

5. Lathe for machining optical workpieces, in particular spectacle lenses, comprising a fast tool arrangement and a workpiece spindle arrangement, which is mounted on a rigid machine bed and is covered by a machine upper part, the machine bed and the machine upper part being made from polymer concrete as a single-piece machine frame, thereby forming all the functional surfaces and spaces, wherein the center of gravity of the machine is provided approximately in a movement plane of the fast tool arrangement.

* * * * *